United States Patent [19]

Willson et al.

[11] Patent Number: 4,635,076
[45] Date of Patent: Jan. 6, 1987

[54] TWO-SIDED OPTICAL RECORDING MEDIUM

[75] Inventors: Richard F. Willson, Hudson, Wis.; Thomas A. Rinehart, St. Paul, Minn.

[73] Assignee: Minnesota Mining and Manufacturing Company, St. Paul, Minn.

[21] Appl. No.: 711,526

[22] Filed: Mar. 14, 1985

[51] Int. Cl.⁴ .................. G01D 15/34; B05D 3/06; B32B 15/04; G03C 1/00

[52] U.S. Cl. .................. 346/135.1; 365/122; 427/43.1; 427/53.1; 427/402; 427/404; 428/692; 428/694; 428/900; 428/913; 430/495; 430/945; 346/1.1

[58] Field of Search ............ 346/135.1; 427/43.1, 427/53.1, 402, 404; 428/913, 692, 694, 900; 430/495, 945; 365/122

[56] References Cited

U.S. PATENT DOCUMENTS

| | | | |
|---|---|---|---|
| 3,902,010 | 8/1975 | Goshima | 369/18 |
| 4,000,492 | 12/1976 | Willens | 346/1.1 |
| 4,090,031 | 5/1978 | Russell | 369/284 |
| 4,109,045 | 8/1978 | Goshima et al. | 428/212 |
| 4,291,119 | 9/1981 | Kido et al. | 430/348 |
| 4,331,966 | 5/1982 | Moe | 346/137 |
| 4,335,198 | 6/1982 | Hanada et al. | 430/348 |
| 4,357,616 | 11/1982 | Terao et al. | 346/135.1 |
| 4,449,138 | 5/1984 | Ando | 346/135.1 |
| 4,450,452 | 5/1984 | Ando et al. | 346/135.1 |
| 4,531,183 | 7/1985 | Morimoto et al. | 346/135.1 |

*Primary Examiner*—E. A. Goldberg
*Assistant Examiner*—Gerald E. Preston
*Attorney, Agent, or Firm*—Donald M. Sell; James A. Smith; William B. Barte

[57] ABSTRACT

The novel optical recording medium, as in the prior art, has a transparent substrate bearing two recording layers, each addressable from only one side of the medium, but unlike prior 2-sided media, the two recording layers are on the same face of the substrate. When the novel medium is addressed from one side of the substrate, a thin-film barrier, such as an opaque metal, between the two recording layers prevents the more distant recording layer from responding to that energy. Preferably a tough, transparent cover layer is sealed to the substrate to protect the two recording layers.

18 Claims, 3 Drawing Figures

TWO-SIDED OPTICAL RECORDING MEDIUM

FIELD OF THE INVENTION

The invention concerns an optically recordable and/or readable medium (usually called an "optical recording medium") having two recording layers, each independently recordable and/or readable from only one side.

BACKGROUND ART

Two types of 2-sided optical recording media are known. One type comprises two transparent substrates, each having a thin-film recording layer on one face. Those two faces are sealed together, preferably by a coextensive transparent adhesive layer. Instead of a coextensive adhesive, the two substrates sometimes are sealed around their center apertures and at their peripheries, thus leaving a void space between their recording layers. Such a void space results in a number of problems discussed in columns 1 and 2 of U.S. Pat. No. 4,450,452 (Ando et al.). A thin-film, oxygen-impermeable protective layer such as $SiO_2$ may cover each recording layer as taught in the Ando et al. patent, and an identical protective layer may separate each recording layer from its substrate to inhibit oxygen and water from reaching the recording layer through the substrate. See U.S. Pat. No. 4,449,138 (Ando). As shown in the Ando '138 patent, the transparent substrate may be flat (FIG. 2) except for spiral or concentric grooves in their inner faces (FIG. 3) to facilitate tracking. Each of the transparent substrates must be nearly optically perfect and, after applying the recording and other layers, must be handled with great care under dust-free conditions until being bonded to the other substrate. When grooved, the grooves of the two substrates must be carefully aligned during assembly to insure that each set of grooves is sufficiently concentric with a spindle hole and/or a circular perimeter of the assembled substrates.

The other known type of 2-sided optical recording media has only one substrate, on each face of which is deposited a thin-film recording layer as illustrated in FIG. 3 of U.S. Pat. No. 4,331,966 (Moe). A pair of tough transparent covers such as glass layers 38' and 44' protect the recording layers. While FIG. 3 shows a void space between each of the recording layers 26' and 50 and its transparent protective cover, it would have been obvious to seal them together with coextensive, void-free adhesive layers as in the Ando et al. patent.

Because of the great care required in making and assembling the described two-sided optical recording media, they are quite expensive, although their high expense may be justified by the tremendous amount of data that can be stored in each recording layer.

DISCLOSURE OF INVENTION

The invention provides a two-sided, optical recording medium that can be produced at significantly reduced cost, while being at least equal in quality, compared to known two-sided media. Briefly, the novel medium comprises a transparent substrate having on one face inner and outer thin-film recording layers, each of which is independently optically addressable (i.e., recordable and/or readable) by energy directed from one side of the medium toward the closer layer, and a thin-film barrier layer between said inner and outer layers preventing the more distant layer from responding to such energy.

Preferred as the thin-film barrier layer is a single opaque reflective layer, e.g., a metal layer such as copper which is highly reflective of laser energy. The additive effect of energy reflected from such a barrier can reduce the energy needed to record information onto the medium. Furthermore, a metal layer provides a heat sink. To provide an equally effective energy reflector and heat sink in prior 2-sided media, each recording surface would require a metal reflecting layer.

For reasons taught in the above-cited U.S. Pat. No. 4,449,138, a first thin-film, oxygen-and-water-impermeable, transparent protective layer such as $SiO_2$ may be applied to the transparent substrate before applying the first or inner thin-film recording layer, and a second such protective layer may be applied over the second or outer thin-film recording layer, thus inhibiting oxygen and water from reaching either recording layer. A tough, transparent cover may then be sealed across the second protective layer, preferably by a coextensive, void-free adhesive layer. When the substrate and cover are disks and the cover is formed with peripheral and central annular ridges, the ridges of the cover may be sealed to the substrate, either adhesively or ultrasonically, thus leaving an air gap across the recording area.

The transparent cover can be sealed to the substrate either by a coextensive adhesive or leaving an air gap, regardless of whether the substrate is pregrooved. A transparent cover both protects the thin-film layers and also keeps out of focus any dirt and dust later encountered in use, as is known in the art. While a transparent cover may be of lower cost than a typical substrate, more important economies are involved:

First, to make one 2-sided medium of the invention, only one side of one substrate needs to receive thin-film coatings, and all coatings can be applied while handling the substrate only once.

Second, when tracking grooves are required, only one surface is grooved.

Third, the prior-art problem of aligning two sets of grooves is eliminated.

A fourth economy which is inherent from the above three is that there should be fewer defective media of the invention compared to prior 2-sided media, e.g., reduced likelihood of dust contamination in a single coating program of the present invention compared to the two separate coating programs inherent in 2-sided media.

As is known in the art, recording and/or readback efficiency is increased by a transparent, thin-film optical interference or spacer layer such as $SiO_2$ between the barrier layer and each recording layer.

To promote adhesion between the barrier and spacer layers, the novel recording medium may include transparent, thin-film primer layers such as $CrO_x$ (x is less than 2).

When the substrate of the novel medium is pregrooved, the thin-film layers should be deposited onto its grooved surface. In doing so, the total thickness of all of the thin-film layers should not be so great as to obscure the groove, preferably not more than 5 micrometers. When the thin-film barrier layer is a thin-film metal layer, its thickness is preferably from 10 to 500 nm.

DETAILED DESCRIPTION

The substrate of the novel medium, which may have a disc shape, may be a thin flexible polymeric film or of a rigid character such as a glass plate. Polymeric materials are preferred because of low cost, durability and ease of manufacture. Furthermore, they are adapted to pregrooving via a variety of replication techniques including molding, casting, chemical etching, etc. A preferred replication technique is mechanical stamping from a master grooved disc. Preferred polymeric materials have low birefringence, as does poly(methylmethacrylate). Other suitable polymers include vinyl resins (polyvinyl chloride, polyvinyl acetate, polyvinyl formal), polyamides, polyimides, polycarbonates, polyacrylics, acrylate polymers such as poly(methylmethacrylate) and copolymers such as of n-butyl methacrylate and acrylic acid, polyesters (polyethylene terephthalate, etc.), polyolefins (polyethylene, polypropylene, etc.).

Each of the thin-film recording layers of the novel medium may comprise any composition or material in which information may be recorded in the form of discrete features or modifications such as can be generated by laser recording systems. Useful optically addressable layers may be magnetically, capacitively, electrically, or optically readable and include ablative or deformable layers (metal, metal compounds such as metal oxides, sulfides, or chalcogenides, metal alloys, metal silicides, or dye ablatives, for example), vesicular layers, dye-forming layers, dye-bleach layers, phase-transition layers, color-shift layers, silver halide layers, magneto-optic, thermomagnetic, and photomagnetic layers. Some of these layers have the advantage of being erasable in either a microscopic or macroscopic sense, thus providing reusable optical storage media. One recording layer of the novel medium may be erasable and the other nonerasable.

As noted above, the optical recording medium of the invention preferably includes a separate thin-film barrier which is highly reflective of laser energy. Preferred are thin-film layers of copper, aluminum, chromium, and gold.

For reasons noted above in connection with the prior art, the novel optical recording medium preferably includes two thin-film, oxygen-impermeable protective layers such as $SiO_2$. Also useful are titanium dioxide, cerium oxide, aluminum oxide, and aluminum nitride. These thin-film protective layers can improve performance via interference enhancement as is known in the art.

A transparent cover may be made of any material that would be useful for the substrate, but it doesn't require the high surface quality and hence can be far less expensive. When adhesively bonding the cover over the coatings of the substrate, the adhesive preferably is curable at ordinary room temperatures, such as are many known 2-part epoxy resin compositions. The adhesive can be curable by exposure to ultraviolet radiation through the cover.

THE DRAWING

Figure 1:
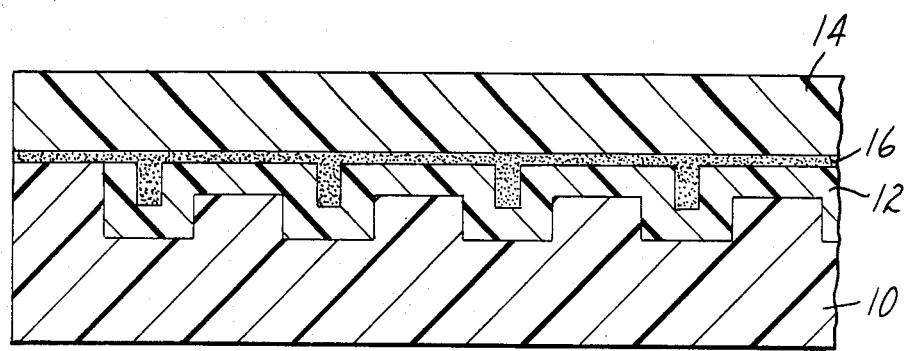
FIG. 1 is a fragmentary schematic central cross-section through a first optical recording medium of the invention.

The optical recording medium shown in FIG. 1 comprises a pregrooved, transparent, disc-shaped substrate 10, on the grooved face of which has been applied a series of thin-film coatings 12. A transparent cover 14 has been bonded to the uppermost of the coatings 12 by a coextensive transparent adhesive layer 16.

Figure 2:
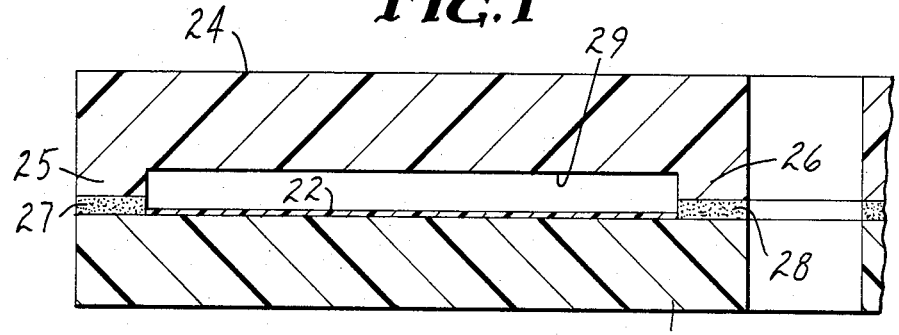
FIG. 2 is a fragmentary schematic central cross-section through a second optical recording medium of the invention.

The optical recording medium of FIG. 2 comprises an ungrooved, transparent, disc-shaped substrate 20 to which has been applied a series of thin-film coatings 22. A transparent cover 24 is formed with a peripheral annular ridge 25 and a central annular ridge 26 which are sealed to the substrate 20 by adhesive layers 27 and 28, respectively, thus leaving an air gap 29 between the cover 24 and the thin-film coatings 22.

Figure 3:
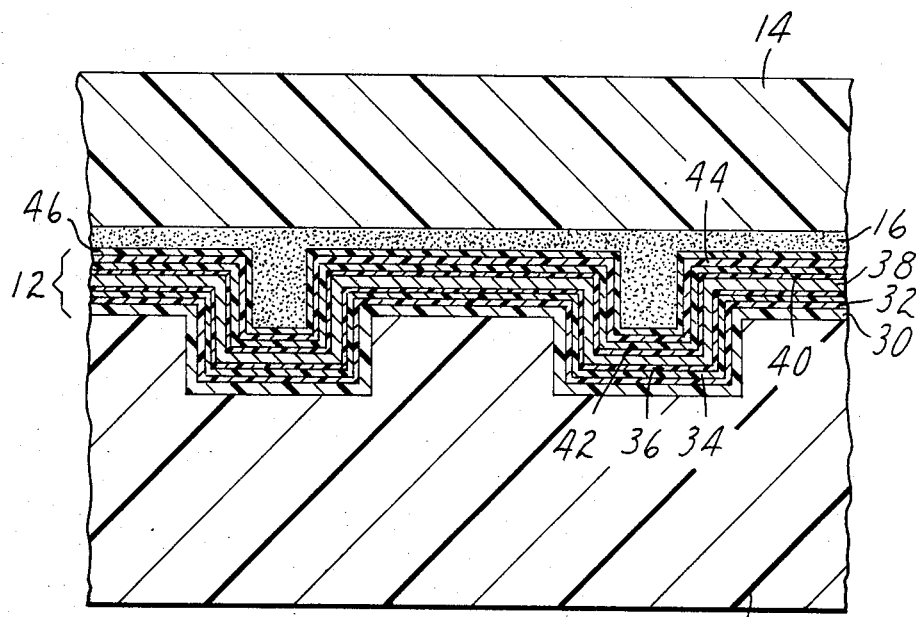
FIG. 3 is an enlargement of a portion of FIG. 1.

FIG. 3 shows that the thin-film coatings 12 of the substrate 10 are in order:

| | |
|---|---|
| First protective layer | 30 |
| First (inner) recording layer | 32 |
| First spacer layer | 34 |
| First primer layer | 36 |
| Reflector layer | 38 |
| Second primer layer | 40 |
| Second spacer layer | 42 |
| Second (outer) recording layer | 44 |
| Second protective layer | 46 |

EXAMPLE 1

A polymethylmethacrylate substrate was pregrooved and preformatted (groove discontinuities for permanent track identification) by replication using an acrylic photopolymer composition. The substrate then was cut to a diameter of 13 cm, and a center hole was cut at the same time. A thin-film, oxygen-and-water-impermeable, first protective layer of silicon sub-oxide was then deposited onto the grooved surface of the substrate. A resistance-heated source, using silicon monoxide granules, at a beam current of about 290 amperes, operating at a background pressure of about $1 \times 10^{-4}$ Pa, was utilized to deposit the silicon sub-oxide protective layer to a thickness of about 40 nm. The deposition rate was about 0.5 nm/sec.

Over the first protective layer, a first recording layer was deposited by sputtering a magneto-optic alloy of cobalt, terbium, and iron to a thickness of about 27 nm. High-purity argon provided a background pressure of about $1.2 \times 10^{-1}$ Pa. The RF-induced substrate bias was about 200 volts, and the target bias about 300 volts DC, thereby achieving a deposition rate of about 0.15 to 0.2 nm per second.

A first silicon sub-oxide spacer layer was deposited over the first recording layer to a thickness of about 29 nm in the same manner as was the first protective layer.

A first primer layer of chromium sub-oxide was deposited over the first spacer layer, via magnetically enhanced reactive sputtering, to a thickness of about 5 nm. A chromium target in a 1% oxygen/99% argon atmosphere was utilized with a target current of about 10A at a pressure of about 0.44 Pa, thereby achieving a deposition rate of about 2 nm per second.

A thin-film reflector layer of copper was deposited over the first primer layer to a thickness of about 125 nm via resistance heating at a background pressure of about $1.3 \times 10^{-4}$ Pa. The deposition rate was about 4 nm per second.

Utilizing conditions previously described, the following thin-film layers were sequentially deposited: a second chromium sub-oxide primer layer onto the reflector layer to a thickness of about 5 nm; a second silicon sub-oxide spacer layer to a thickness of about 29 nm; a second magneto-optic recording layer to a thickness of about 28 nm; and a second silicon sub-oxide protective layer to a thickness of about 40 nm.

Subsequently, a non-grooved, transparent polymethylmethacrylate cover in the form of a 13-cm diameter disc, having a thickness of about 0.11 cm, was bonded to the exposed second protective layer using a room-temperature-curing 2-part epoxy resin adhesive. The adhesive was poured onto the center of the substrate which had been placed on a flat table, silicon sub-oxide layer up. The cover then was placed on the adhesive, and a weight was applied to cause the adhesive to flow outwardly to create a void-free adhesive layer which became completely cured within 24 hours at 20° C.

Test Results

The optical recording medium of Example 1 was optically recorded and then read using apparatus similar to that described at columns 6 and 7 and FIG. 3 of U.S. Pat. No. 3,651,281. In the present apparatus used to obtain these test results, a laser diode emits a diverging beam at a wavelength of about 830 nm, which is polarized, modulated, collected, and collimated by a lens and made circular by a prism. This circular beam is directed by mirrors through a focusing head onto the medium. By virtue of the combined Kerr and Faraday rotations, the plane of polarization of the light is rotated through angle theta. Upon reflection, all of the rotated light, as well as part of the non-rotated light, is directed onto a read path through polarizing beam splitters and toward photodiode detectors. Focusing of the read beam onto the medium can be done by imaging optics.

A biasing magnet is located near the medium at the point where the beam strikes it. The bias field used in recording can influence carrier-to-noise ratio. However, as long as the bias field is more than about 300 oersteds, carrier-to-noise (C/N) ratio is relatively independent of bias field strength.

When the same groove, designated as track #817, was accessed from each side of the optical recording medium, the read amplitude and signal quality of the preformat (track identification) were, within experimental error, equivalent from either side. When track #817 was recorded from Side A (the substrate side) at about 4 MHz with a C/N ratio of about 55.4 dB and then read from Side B (the cover side), no trace of the signal was detectable. When a 3-MHz signal was recorded on track #817 from Side B with a C/N ratio of about 55 dB, a slight signal was detectable from Side A, but the detected signal was about 40 dB below the fundamental, an acceptable crosstalk level.

I claim:

1. Optical recording medium comprising a transparent substrate having on one face
    inner and outer thin-film recording layers, each of which is independently optically addressable by energy directed from one side of the medium toward the closer layer, and
    a thin-film opaque reflective barrier between said inner and outer layers preventing the more distant layer from responding to such energy, and
    a transparent, thin-film spacer layer between the opaque reflective layer and each recording layer.

2. Optical recording medium as defined in claim 1 wherein the opaque reflective layer is metal.

3. Optical recording medium as defined in claim 1 having two transparent, thin-film, oxygen-and-water impermeable protective layers, one between the substrate and the inner recording layer and the other covering the outer recording layer.

4. Optical recording medium as defined in claim 3 including a transparent cover sealed to the substrate to protect said thin-film layers.

5. Optical recording medium as defined in claim 4, the transparent cover of which is sealed across the outermost of said thin-film layers by a coextensive, void-free, transparent adhesive layer.

6. Optical recording medium as defined in claim 5 wherein the adhesive layer is ultraviolet-cured.

7. Optical recording medium as defined in claim 4 wherein the substrate is sealed to the cover around center aperatures and at their peripheries, leaving a void space between the thin-film layers and the cover.

8. Optical recording medium as defined in claim 1, at least one recording layer of which contains recorded information.

9. A method of forming an optical recording medium comprising the steps of:
    (a) providing a transparent substrate;
    (b) applying over one face of said substrate a first thin-film optically addressable recording layer;
    (c) applying over the exposed face of said first recording layer a substantially opaque, reflective metallic thin-film barrier layer, and
    (d) applying over the exposed face of said barrier layer a second thin-film optically addressable recording layer, wherein the opacity of said barrier layer prevents energy having less than a predetermined intensity directed from one side of the medium toward the closer recording layer from passing through the barrier layer to directly affect the more distant recording layer, the reflecting redirects such energy toward the closer recording layer to thereby reduce the amount of energy needed to record information in that layer, and the heat capacity associated with the metallic composition of the barrier layer results in that layer being a heat sink, thus preventing the more distant recording layer from indirectly responding to such energy directed from one side of the medium toward the closer recording layer.

10. A method according to claim 9, further comprising the step of applying a transparent, thin-film spacer layer between the opaque reflective layer and each recording layer.

11. A method according to claim 9, further comprising the steps of applying two transparent, thin-film, oxygen-and-water-impermeable protective layers, one between the substrate and the inner recording layer and the other covering the outer recording layer.

12. A method according to claim 11, further comprising the step of sealing a transparent cover to the substrate to protect said thin-film layers enclosed therebetween.

13. A method according to claim 12, wherein said transparent cover is sealed across the outermost of said thin-film layers by a coextensive, void-free, transparent adhesive layer.

14. A method according to claim 9, further comprising the additional step of recording information onto at least one recording layer.

15. A method according to claim 9, comprising recording by directing a laser beam having a predetermined maximum intensity toward one surface of the medium to cause the beam to impinge upon the recording layer closest to that surface, said predetermined intensity being insufficient to affect either the inner barrier layer or the more remote recording layer.

16. Optical recording medium comprising a transparent substrate having on one face inner and outer thin-film recording layers, each of which is independently optically addressable by energy directed from one side of the medium toward the closer layer, and a thin-film opaque reflective metal barrier between said inner and outer layers, wherein the opacity of said barrier layer prevents energy having less than a predetermined intensity directed from one side of the medium toward the closer recording layer from passing through the barrier layer to directly affect the more distant recording layer, the reflective nature of the barrier layer causes such energy to be redirected toward the closer recording layer to thereby reduce the amount of energy needed to record information in that layer, and the heat capacity associated with the metallic composition of the barrier layer results in that layer being a heat sink, thus preventing the more distant layer from indirectly responding to such energy directed toward the closer layer.

17. Optical recording medium comprising a transparent substrate having on one face inner and outer thin-film recording layers, each of which is independently optically addressable by energy directed from one side of the medium toward the closer layer and at least one of which comprises a magneto-optic alloy, and a thin-film barrier between said inner and outer layers preventing the more distant layer from responding to such energy.

18. Optical recording medium as defined in claim 17, wherein said substrate face contains a plurality of grooves for purposes of tracking impinging radiation during subsequent use, and wherein said thin film layers cover substantially all of said face and the total thickness thereof does not obscure the groove.

* * * * *